United States Patent [19]

Takahashi

[11] Patent Number: 4,807,079

[45] Date of Patent: Feb. 21, 1989

[54] DISK CARTRIDGE

[75] Inventor: Kenji Takahashi, Miyagi, Japan

[73] Assignee: Sony Corporation, Tokyo, Japan

[21] Appl. No.: 89,603

[22] Filed: Aug. 25, 1987

[30] Foreign Application Priority Data

Sep. 1, 1986 [JP] Japan ................................. 61-205454

[51] Int. Cl.⁴ ............................................ G11B 23/03
[52] U.S. Cl. .................................................... 360/133
[58] Field of Search ........................ 360/133, 99, 132; 369/291, 77.2; 206/444, 312

[56] References Cited

U.S. PATENT DOCUMENTS

| | | | |
|---|---|---|---|
| 4,503,474 | 3/1985 | Nigam . | |
| 4,550,354 | 10/1985 | Wakabayashi et al. . | |
| 4,589,105 | 5/1986 | Nemoto | 360/133 X |
| 4,682,322 | 7/1987 | Ohta | 360/133 X |

FOREIGN PATENT DOCUMENTS 0137965 4/1985 European Pat. Off. .
0174651 3/1986 European Pat. Off. .

Primary Examiner—A. Heinz
Attorney, Agent, or Firm—Philip M. Shaw, Jr.

[57] ABSTRACT

A disk cartridge includes a main body rotatably containing a disk and having a window or aperture for exposiing a portion of the disk to outside and an approximately arcuate rib for limiting the disk movement, a shutter for opening or closing the window or aperture, and a torsion spring urging the shutter in a direction of closing the window or aperture. The end of the arm of the torsion spring that is supported by the main body of the cartridge is supported by a guide support provided to the inner surface of the main body of the cartridge and having its supporting point variable with shutter movement.

7 Claims, 4 Drawing Sheets

DISK CARTRIDGE

BACKGROUND OF THE INVENTION

1. Field of the Invention

This invention relates to a disk cartridge wherein the main body of the cartridge containing a disk on which predetermined information signals are recorded, such as an optical disk or a magnetic disk, and including a window for exposing a portion of the disk to the outside, is provided with a slide shutter adapted for opening and closing the window. More particularly, it relates to such a disk cartridge in which a torsion spring is provided within the main body of the cartridge for urging the shutter in a window closure direction.

2. Related Art Statement

It is known to provide a disk cartridge of the type wherein the main body of the cartridge contains a disk on which predetermined information signals are recorded, such as an optical disk or a magnetic disk, and which includes a window for exposing a portion of the disk to the outside, with a slide shutter adapted for opening and closing the window. It is further known to provide a torsion spring within the main body of the cartridge for urging the shutter in the window closure direction. Such a cartridge is disclosed, for example, in the Japanese Laid-open Patent Publication NO. 169379/1983 or U.S. Pat. No. 4,550,354.

In the above described prior-art disk cartridge, the torsion spring urging the slide shutter in this manner is mounted within the space of a corner surrounded by a disk container provided in the main body of the cartridge, the front wall and one side wall of the main body. One end of the torsion spring extends from the central torsion coil to engage a corner where the front wall intersects the one side wall, while the other end of the torsion spring extends from the other end of the torsion coil to engage one lateral side of the shutter. In following up the opening and closing movement of the shutter, the torsion spring is flexed throughout the extent of the corner of the main body of the cartridge such that it is not possible to provide threaded boss projections at the corner of the main body for interconnecting the upper and lower halves that make up the main body.

For this reason, the upper and lower halves of body of the cartridge are connected together by an using an adhesive or by ultrasonic welding method. Should either such connecting method be used, the upper and lower halves cannot be separated from each other, so that it becomes extremely difficult to replace the disk even if the disk is scratched or otherwise injured and hence unable to be used for regular recording and/or reproducing operations. In addition, it becomes difficult to re-use the main body of the cartridge.

In view of these inconveniences, and with reference to FIG. 1, it has been proposed in a prior patent application of the present assignee to attach a shutter 104 to a slide member 103 which is slidably supported by a main body of the cartridge 101 and having a first rack gear 102 on one lateral surface of the slide member 103, with the shutter 104 being slidable with respect to the main body of the cartridge 101. A second stationary rack gear 105 is attached to the main body of the cartridge 101 in opposition to the first rack gear 102 and a pinion 106 is interposed between these rack gears 102 and 105. The shutter 104 for opening or closing a window 107 provided in the main body of the cartridge 101 is biased in a direction to close the window 107 by means of a torsion spring 108 which is positioned within the space of a corner of the main body of the cartridge 101. The Torsion spring's end are captured between a support point 110 attached to the main body 101 and a spring holder 109 rotatably fitted to the pinion 106. That is, the torsion spring 108 has the end of one arm 108b extending from a torsion coil 108a and retained by the support 110 provided at the corner of the main body of the cartridge 101 and has the end of the other arm 108c retained by the spring holder 109.

During the time the disk is not used, the pinion 106 interposed between the first rack gear 102 of the slide member 103 and the second rack gear 105 of the main body of the cartridge 101 is turned relative to the second rack gear 105 under the force of the torsion spring 108, in such a manner that the slide member 103, meshing with the pinion 105, is thrust and slid so that the window 107 is closed by the shutter 104 attached to the slide member 103.

During the time the disk is in use, the shutter 104 is slid by the shutter opening and closing system of a recording and/or reproducing apparatus. For example, the slide member 103 is slid to cause the pinion 106 to be turned relative to the second rack gear 105 of the main body of the cartridge 101 by the first rack gear 102 provided to the slide member 103. The pinion 105 is turned at such time with a rolling motion so that the horizontal distance traversed by the pinion 105 as it is turned is approximately one half that traversed by the slide member 103, such that, when the shutter 104 is slid to a position of completely opening the window 107, the pinion 106 is positioned intermediate between the window 107 and one side wall of the main body of the cartridge 101. In such a manner, the flexing shifting of the torsion spring 108 installed between the pinion 106 and the main body of the cartridge 101, that is, the horizontal distance traversed by the end of the arm 108c during flexure of the torsion spring 108, is about one half the slide stroke of the slide member 103, so that there may be provided at the corner of the main body of the cartridge 101 a space sufficient to accommodate threaded boss projections 111 for interconnecting the upper and lower halves of the main body of the cartridge 101.

In the aforementioned conventional disk cartridges, the ends of the torsion spring for biasing the shutter are secured. Thus, in the disk cartridge described in the present applicant's prior application, the torsion coil 108a of the torsion spring 108 pivots with the opening and closing movement of the shutter 104 about the supporting point O of the arm 108a with a trajectory being on a circumference of a circle having the arm 108b as a radius.

The main body of the cartridge 101 has the shape of a square inscribed by a circle that is the contour of the disk accommodated therein, in order to minimize its size. Within the main body of the cartridge 101, rib sections 113 are formed for encircling the disk 112 along its outer periphery for restricting the disk movement within the main body of the cartridge 101 in order to protect the disk 112. Thus, in the disk cartridge shown in FIG. 1, the torsion coil 108a is closest to the rib section 113 when the torsion spring 108 is shifted as a result of the shutter movement to a position at a minimum distance between the rib section 113 and the support 110. At this time, there is the risk of the torsion coil 108a conflicting with the rib section 113 if the dimensional tolerances in casting the rib section 113 and the support 110 or in producing the torsion spring 108 act in concert for reducing the aforementioned minimum distance. Should the torsion coil 108a conflict with the rib section 113, not only the desired spring pressure of the torsion spring 108 or the smooth opening and closure of the shutter 104 cannot be obtained, but also the movement of the torsion spring and the pinion 106 is impeded. This results in inhibition of the shutter movement for window opening or closure and destruction of the main body of the cartridge 101. In the case of a disk cartridge which is devoid of the rib sections 113, the torsion coil of the spring may conflict with the outer periphery of the disk thus giving rise to a similar phenomenon and possibly to disk destruction.

In order to eliminate such inconvenience and to provide the a trajectory for the torsion coil 108a of the torsion spring 108 as it shifted with the window opening and closing movement of the shutter 104 as indicated by Y in FIG. 1, it may be contemplated to make the length of the arm 108b, supported by the main body of the cartridge 101, longer than that of the other arm 108c as indicated by a dotted line in FIG. 1 and to shift the position of the support 110 retaining the end of the one arm 108b towards the front side of the main body of the cartridge 101.

However, when the torsion spring 108 has such a disymmetrical shape, attachment of the torsion spring becomes increasingly difficult especially when employing an automatic assembling device.

OBJECT AND SUMMARY OF THE INVENTION

It is therefore an object of the present invention to provide an improved disk cartridge of the type in which a symmetrically shaped torsion spring can be shifted in the main body of the cartridge as a result of a window opening and closing operation for a shutter and yet is able to be moved within the narrow space at the corner of the main body of the cartridge without conflicting with a rib section or with the disk itself.

It is another object of the present invention to provide a disk cartridge according to which the optimum spring pressure of the torsion spring can be maintained for assuring smooth window opening and closing operation of the shutter.

It is a further object of the present invention to provide a disk cartridge that is easy to manufacture and assemble and low in manufacturing costs.

In accordance with the present invention, there is provided a disk cartridge comprising a main cartridge body for rotatably containing a disk therein and having an aperture for exposing a portion of said disk to the outside; a shutter slidably mounted to said main body of the cartridge for opening and closing said aperture; and a torsion spring provided in said main body of the cartridge for urging said shutter in the aperture closing direction. One end of the torsion spring is supported by a guide support provided on the inner surface of the main body of the cartridge and having its supporting point variable with movement of the shutter.

According to the present invention, since one end of the torsion spring has its supporting point shifted as the spring is guided by the support during flexure of the torsion spring, the trajectory of the torsion spring deviates from the circumference of a circle so that there is no risk of the coil conflicting with the rib section.

DESCRIPTION OF THE PREFERRED EMBODIMENT

A preferred embodiment of the present invention will hereafter be described by referring to the accompanying drawings.

Figure 2:
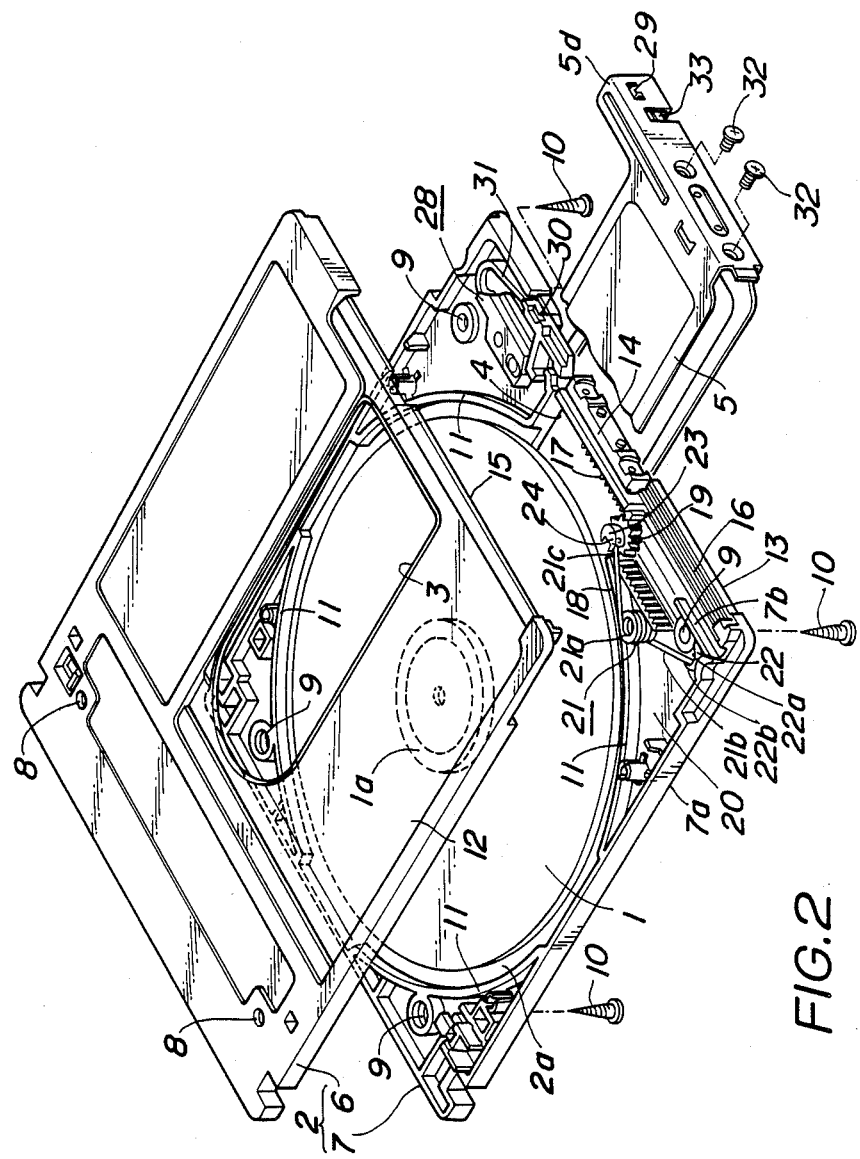
FIG. 2 is an exploded perspective view of the disk cartridge shown in FIG. 4.
Figure 3:
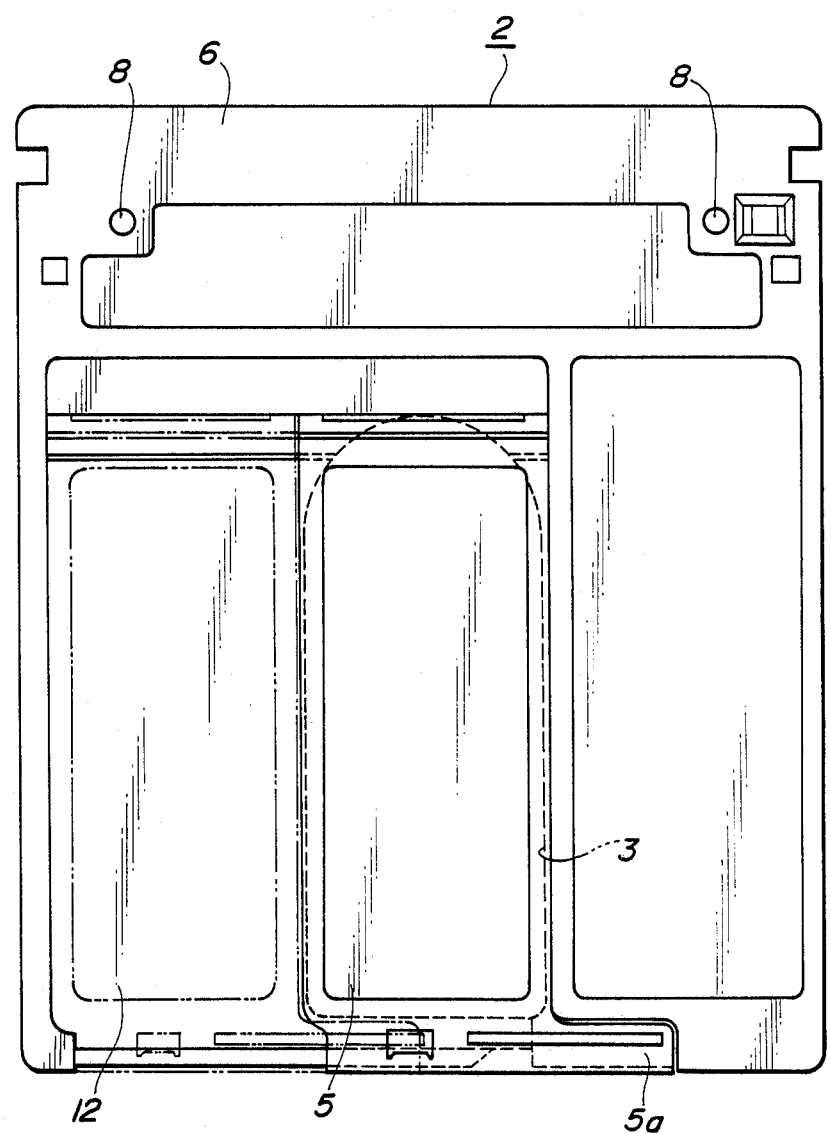
FIG. 3 is a plan view showing the assembling state of the disk cartridge shown in FIG. 4.

As shown in FIG. 2, a disk cartridge according to the present invention is formed by a main body of the cartridge 2 in which there is accommodated a disk 1, such as an optical or magnetic disk on which prescribed information signals are written, and a slide type shutter 5 formed by a thin metallic plate bent in the form of a letter U. The slide shutter 5 is slidably mounted to the main body 2 and adapted for opening or closing windows 3, 4 to expose the disk 1 to the outside of the main body 2.

This main body 2 is formed by an upper half shell 6 and a lower half shell 7, each having a square shape and abutted and connected to each other by set screws 10 and associated threaded boss projections 8, 9 provided at the four corners.

On the inner surface of the upper and lower halves 6 and 7, there are formed arcuate rib sections 11 for delimiting a disk housing 2a within the main body of the cartridge 2 for encircling and protecting the disk 1 contained therein. At the center transversely of the upper and lower halves 6, 7, the aforementioned windows 3, 4 are formed extending from the forward edge towards the center. These windows 3, 4 are formed of such a size that a chucking hub 1a provided to the center of the disk 1 and the signal recording surface of the disk 1 can be exposed along the radial extent to the outside of the main body of the cartridge 2. On an outer lateral side of each of the upper and lower halves 6 and 7, guide surface sections 12 and 13 for the shutter 5 are formed, inclusive of the periphery of the windows 3 and 4. On the inner surface along the front edges of the upper and lower halves 6 and 7, and in registry with these guide sections 12 and 13, there are formed engagement guide grooves 15 and 16 for a slide member 14 for supporting the shutter 5 slidably relative to the main body of the cartridge 2. The slide member 14 is held between and supported by the engagement guide grooves 15 and 16, when the upper and lower halves 6 and 7 are abutted and connected to each other, in such a manner that the slide member may be slid as it is guided engagement with these guide grooves.

Figure 4:
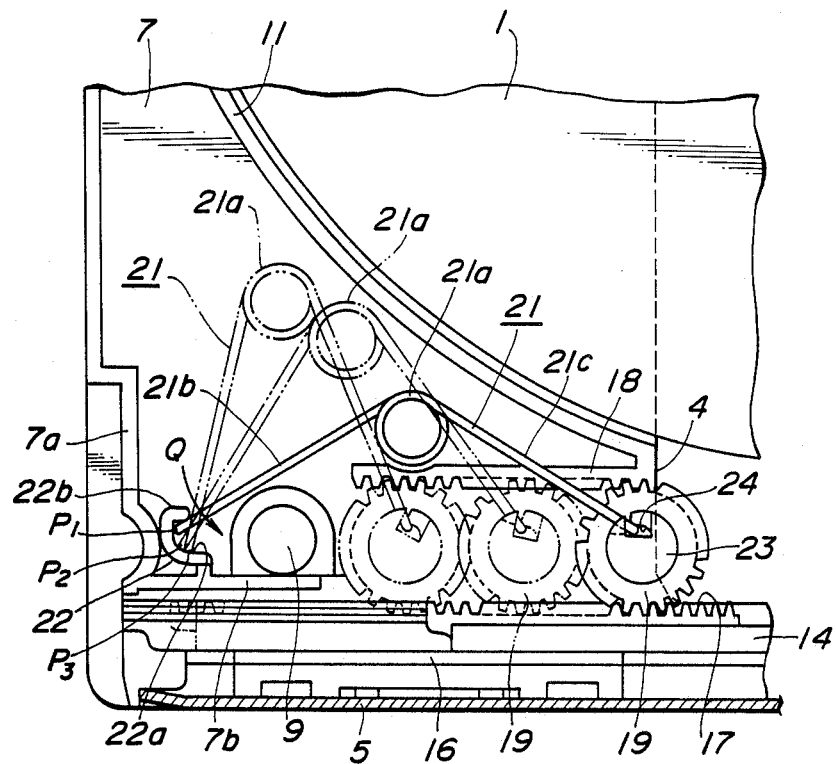
FIG. 4 is an enlarged, horizontal view, partly in section and with parts broken away showing the mounting and shifting state of the torsion spring of the disk cartridge according to the present invention.

A first rack gear 17 is formed on a lateral side of the slide member 14 facing toward the inner side of the main body of the cartridge 2, while a second rack gear 18 is securely provided intermediate between the window 4 and a lateral wall 7a on the forward edge of the lower half 7 in a parallel facing relation to the first rack gear 17. As best shown in FIG. 4, a pinion 19 is interposed for rolling between the first rack gear 17 and the second rack gear 18. The arrangement is so made that the rolling of the pinion 19 and the sliding of the slide member 14 will occur in operative association with the second rack gear 18. The pinion gear 19 is perpetually offset when rolling in the direction of the window 4 relative to the second rack gear 18 by a torsion spring 21 provided in one front side corner 20 that is encircled by the rib section 11 delimiting the disk housing 2a, one lateral wall 7a and the front wall 7b of the lower half 7. Thus the slide member 14 is slid to a position that is in register with the front side of the window 4. In such manner, the shutter 5 mounted to the slide member 14 is biased by the torsion spring 21 so as to be slid in a direction of closing the windows 3 and 4 of the main body of the cartridge 2.

During this time, the slide member 14 is moved relative to the rolling of the pinion 19 so that the slide member 14 may be moved to a position completely displaced from the position in register with the window 4 while the pinion 19 is moved in rolling a transverse distance equal to about half the distance the slide member 14 is moved in the above manner for opening the window 4 by the shutter 5. Hence, the second rack gear 18 can be of a length equal to about half the shutter stroke to allow for the threaded boss projections 8 and 9 at the corners of the main body of the cartridge 2.

The torsion spring 21 has a torsion coil 21a from one end of which an arm 21b is extended and engaged at its end by an upright guide support 22. The guide support 22 is located adjacent to the threaded boss projection 9 in the vicinity of the intersection between one side wall 7a and the front wall section 7b within the space of the corner 20 of the lower half 7. The other arm 21c of the torsion coil 21a has its end engaged in an offset slot 24 of a spring holder 23 turnably fitted to the pinion 19. Thus the pinion 19 is perpetually biased for rolling in the direction of the window 4 relative to the rack 18. It should be noted that the end of the other arm 21c of the torsion spring 21 is engaged at an offset position of the spring holder 23 so that the pinion 19 is caused to roll by the flexural shifting of the torsion spring 21.

The guide support 22 engaging with the end of the arm 21b of the torsion spring 21 is so contoured that the point of support the end of the arm 21b is moved from $P_1$ to $P_2$ to $P_3$ so as to follow the flexural shifting of the torsion spring 21. That is, the guide support 22 has its guide supporting surface 22a for the end of the arm 21b contoured in the shape of an arc substantially coincident with the trajectory of the end of the arm 21b during the flexural shifting of the torsion spring 21. The end of the guide support 22 towards which the one end 21b is moved is provided with a bent edge 22b to capture the end of the arm 21b to prevent the arm end from extricating itself from the guide support 22 when the support point of the torsion spring 21 is moved as a result of flexural shifting of the torsion spring 21.

As best depicted in FIG. 2, at the corner on the forward edge of the main body of the cartridge 2, opposite to the side provided with the torsion spring 21, a locking member 28 is provided for locking the shutter 5 in the window closure position when the shutter 5 reaches such position, that is, the position of closing the windows 3 and 4. The locking member 28 includes a resilient deflecting portion 31 having an engaging recess 30 and extending in the direction of the extension of the engaging guide slot 16. A locking piece 29 provided on the slide guide 5a and extending transversely from the forward edge of the shutter 5 engages with the recess 30.

In assemblying the disk cartridge, the upper and lower halves 6 and 7 with the disk 1 contained therein are abutted and connected to each other by means of set screws 10 for assembling the main body of the cartridge 2. The slide shutter 5 is then inserted from the forward edge of the main body of the cartridge 2 and secured by set screws 32 to the outwardly facing side of the slide member 14 mounted in engagement with the guide grooves 15 and 16 of the upper and lower halves 6 and 7, respectively.

During the time disk cartridge is out of use, when the slide shutter 5 is to be in the state of closing the windows 3 and 4 of the main body of the cartridge 2, the slide member 14 is moved to the ends of the guide grooves 15 and 16 towards the windows 3 and 4 by the sliding of the slide member 14 under the bias of the torsion spring 21. The locking price 29 of the shutter 5 is engaged in the recess 30 of the locking member 28 so that the shutter 5 is locked against shifting in a direction which would inadvertently open the windows 3 and 4.

When the disk cartridge is loaded in the recording and/or reproducing apparatus, a shutter opening and closing pin provided to the apparatus is engaged in a recessed opening 33 provided in the outward side of the slide shutter 2 for thrusting against the resilient deflecting portion 31 of the locking member 28 to cause the locking piece to disengage from the recess 30, while thrusting the shutter 5 in a direction to open the windows 3 and 4. When the shutter 5 is thrust in this manner, the slide member 14 is slid along the engaging guide slots 15 and 16 of the main body of the cartridge 2. By such sliding of the shutter 5, the pinion 19 is caused to roll relative to the second rack gear 18 against the resilient bias of the torsion spring 21, at the same time that the torsion spring 21 is shifted within the space of the corner 20 of the main body of the cartridge 2. The rolling of the pinion 19 caused by the flexural shifting of the torsion spring 21 takes place freely relative to the racks 17 and 18 and the spring holder 23 in which the end of the arm 21c of the torsion spring 21 is engaged. When the shutter 5 has been moved to completely open the windows 3 and 4, the slide member 14 is at the ends of the engagement guide grooves 15 and 16 towards the one side wall section of the main body of the cartridge 2. In this state, since the pinion gear 19 reaches only about the mid position of the slide stroke of the slide member 14, as stated above, the torsion spring 21 is flexed to about the center of the corner of the main body of the cartridge 2, as shown in FIG. 4, without traversing the threaded connecting portion 9 provided towards the one side wall section of the corner 20 of the main body of the cartridge 2.

Figure 1:
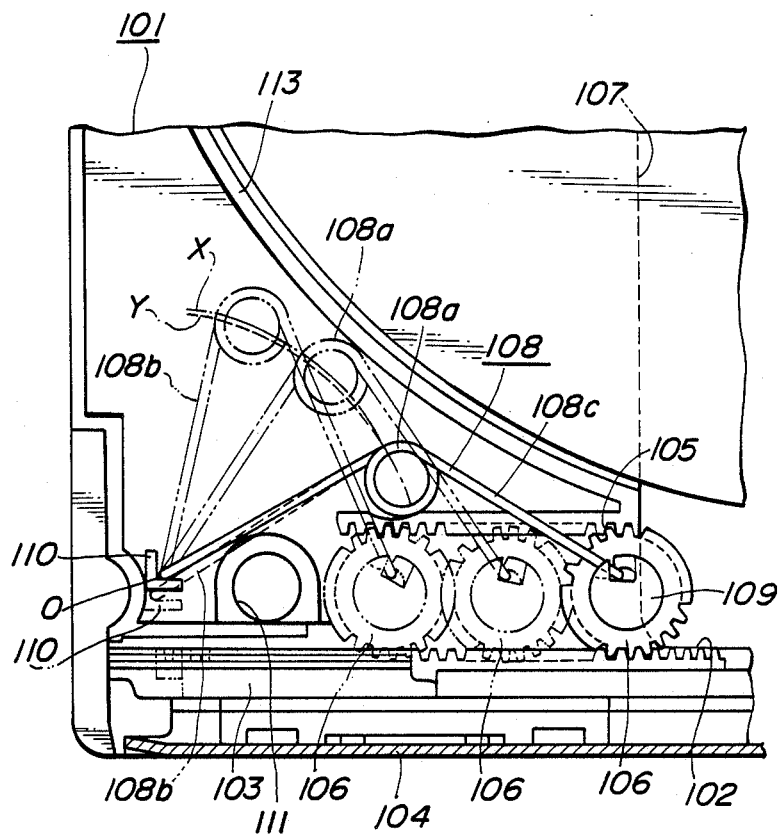
FIG. 1 is a plan view showing the mounting and shifting state of the torsion spring of a conventional disk cartridge.

During the shutter opening operation the torsion spring 21 is flexed to cause the ends of the arms 21b and 21c to approach towards each other and the end of the arm 21b is moved along the guide support surface 22a of the guide support 22 such that the supporting point on the surface 22a is moved towards the front side of the main body of the cartridge 2 as indicated by an arrow Q in FIG. 4. That is, the supporting point of the end of the arm 21b on the guide supporting surface 22a is at a position $P_1$ in FIG. 1 when the shutter 5 is at the position of closing the windows 3 and 4. As the spring 21 is flexed with movement of the shutter 5, the supporting point P is moved towards the front side of the main body of the cartridge 2 to a position $P_2$. As the shutter 5 is moved to the position of opening the windows 3 and 4, the supporting point P is at a position $P_3$. As the supporting point of the end of the arm 21b is shifted in such manner, the torsion coil 21a of the spring 21 is moved as indicated by a chain line in FIG. 4, as it is shifted away from the rib section 11 a distance corresponding to the movement of the spring end supporting point ($P_1$, $P_2$, $P_3$) towards the front side of the main body of the cartridge 2. In other words, the coil 21a is moved along a path deviated from the circumference of a circle having the arm 21b as the radius in the direction of the front side of the main body 2.

When the shutter 5 is moved from the window opening position to the window closing position, the torsion spring 21 is resiliently moved to the extended continuous-line position in FIG. 4 as the supporting point P of the extreme end of the one arm 21b on the guide support surface 22a is moved in the reverse of the above described sequence. During this resilient movement of the torsion spring 21, the torsion spring 21a is shifted similarly in a direction away from the rib section 11.

In the above described embodiment, the rack and pinion system is used as the slide system for the shutter 5. Alternatively, the torsion spring 21 may be designed to act directly on the shutter 5 without providing a rack and pinion system. In such case, the end of the torsion spring 21 supported by the shutter 5 may be supported by the guide support 22 having a variable supporting point for the aforementioned end of the torsion spring 21. That is, the guide supporting member 22 as described above may be provided to one side of the shutter 5. In this case, the supporting point of the torsion spring on the main body of the cartridge 2 is stationary.

It can be seen from the foregoing that the present invention provides an arrangement in which the disk cartridge shutter spring has one end supported by a guide support having a variable supporting point, so that the trajectory of the coil of the torsion spring, when the shutter is shifted between open and closed positions is moved away from the circumference of a circle having the arm of the torsion spring as the radius. In such manner, there is provided a disk cartridge in which a portion of the torsion spring that is shifted in the main body of the cartridge with the movement of the shutter may be moved in the narrow space at the corner of the main body of the cartridge without conflicting with the rib section that is provided in the main body of the cartridge for protecting the disk.

In such disk cartridge, there is no risk that a portion of the torsion spring should conflict with a portion of the main body of the disk cartridge, so that the spring pressure of the torsion spring can be maintained and the shutter can be opened and closed smoothly to provide for positive closure and opening of the windows by the shutter.

What is claimed is:

1. An improved disk cartridge of the type having a main body for containing a revolvable disk therein and having an aperture for exposing a portion of the disk to the outside and a shutter slidably mounted on the main body for opening and closing the aperture, and a two ended torsion spring provided in the main body for urging the shutter in a direction which closes the aperture, the torsion spring having two ends, wherein the improvement comprises:

a spring and guide support for one end of the torsion spring, the spring end guide support being provided on the inner surface of the main body of the cartridge and having a supporting point which is variable with movement of the shutter wherein the one end of the torsion spring is moved in an arcuate trajectory when the shutter is moved and further wherein the spring end guide support has a concave guide portion substantially coinciding with the trajectory of the one end of the torsion spring that is moved with movement of the shutter.

2. A disk cartridge according to claim 1 further comprising a slide mechanism attached to one lateral side of the main body for allowing the shutter to be slidable relative to the main body of the cartridge.

3. A disk cartridge according to claim 2 wherein the slide mechanism comprises a spring holder for holding the other end of the torsion spring, a rolling pinion in which the spring holder is rotatably mounted, a first rack gear meshing with the rolling pinion and movable with the shutter, and a second rack gear provided in the main body of the cartridge, parallel and opposite to the first rack gear and meshing with the rolling pinion.

4. A disk cartridge according to claim 3 wherein the first rack gear is attached to the slide mechanism.

5. A disk cartridge according to claim 3 wherein rib sections are provided on the inner surface of the main body of the cartridge for restricting the movement of the disk in the housed state.

6. A disk cartridge according to claim 1 wherein the spring end guide support has a bent rim contiguous to the arcuate guide portion, the bent rim serving to prevent the one end of the torsion spring from being extricated from the spring end guide support.

7. A disk cartridge according to claim 6 wherein the spring end guide support is formed in the shape of a letter U.

* * * * *